Patented Sept. 15, 1931

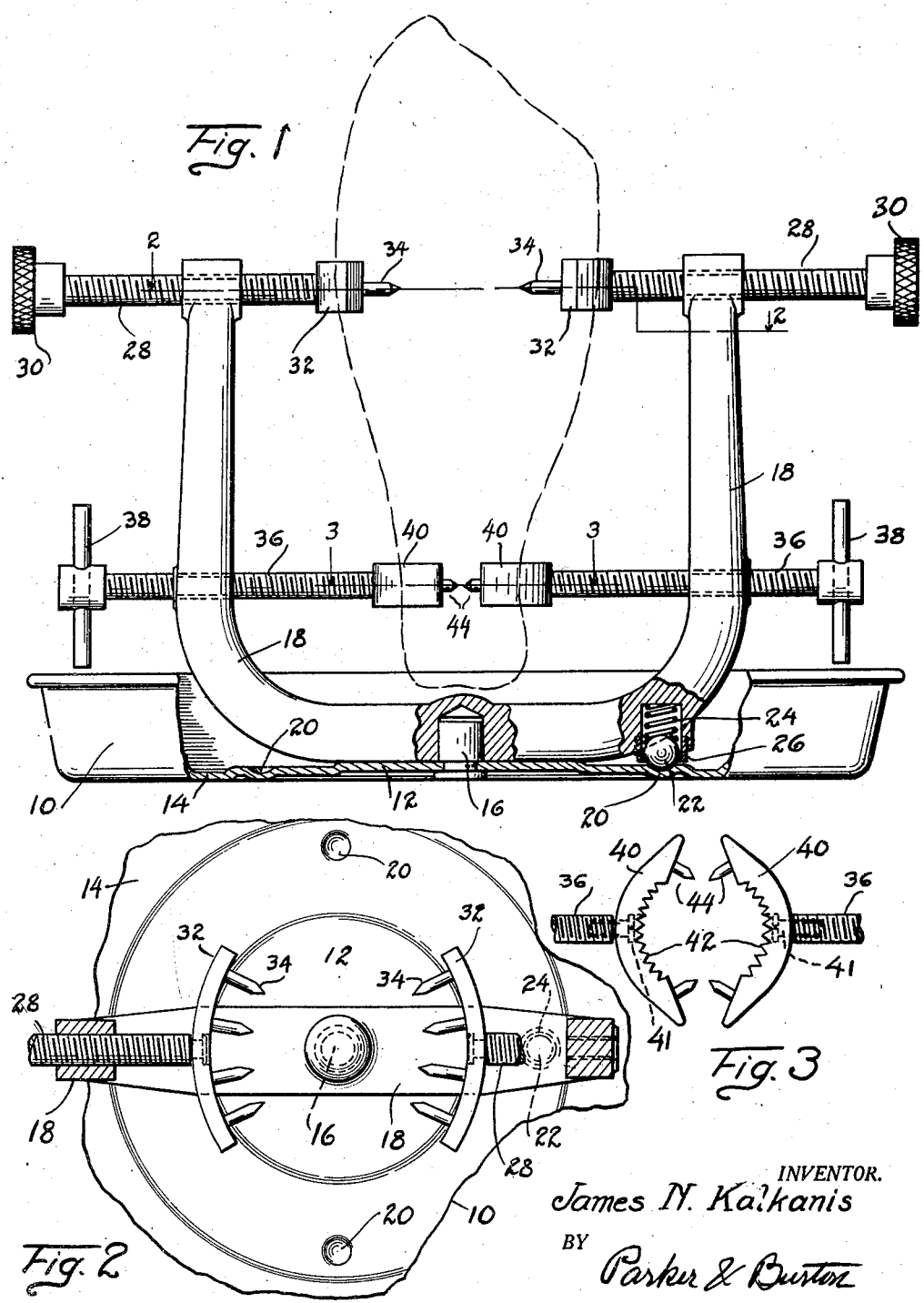

1,823,608

UNITED STATES PATENT OFFICE

JAMES N. KALKANIS, OF DETROIT, MICHIGAN

HOLDER FOR HAMS OR THE LIKE

Application filed December 5, 1928. Serial No. 323,891.

My invention relates to an improved holder for hams and the like.

An object is the provision of a device adapted to support a ham or similar article in such a manner that it may be conveniently sliced. An important feature of my invention resides in the provision of such a device which is adapted to support a ham in the upright position and in such a manner that the ham may be rotated while being rigidly supported. The holder is so constructed that the ham may be raised or lowered with respect to its support and the ham engaging portions of the holder are relatively individually adjustable to engage the ham and particularly adapted to securely impinge that portion of the ham engaged thereby.

Other meritorious features and advantages of my invention will more fully appear from the following description, appended claims and accompanying drawings, wherein—

Fig. 1 is a side elevation partly broken away of my improved ham holder in use.

Fig. 2 is a cross-sectional view taken on line 2—2 of Fig. 1.

Fig. 3 is a cross-sectional view taken on line 3—3 of Fig. 1.

In the embodiment of my invention illustrated in the drawings I provide a base which is of dished or pan like construction and indicated generally by the numeral 10. This base has an elevated central portion 12 surrounded by a depressed marginal or gutter like portion 14. A supporting pivot or pintle 16 is arranged substantially axially of the base and serves as a pivotal support for a rigid U-shaped member 18 arranged thereon in an upright position and mounted for rotation. The pan like base is provided with a series of depressions 20 adapted to receive a ball 22 held downwardly by a spring 24 within a cup 26 carried by the U member 18 as appears in Fig. 1 so as to lock the U member in adjusted positions of rotation.

Each rigid upright arm of the U-shaped member carries a pair of ham supporting screw elements which are arranged opposite the ham supporting screw elements carried by the other arm as appears in Fig. 1. The uppermost pair of screw elements are indicated by the numeral 28 and each is provided with a knurled knob 30 whereby it may be rotated and at its inner end it is provided with an arcuate jaw 32 freely journalled thereon and having ham engaging tines 34 adapted to impinge a ham supported between the upright arms of the U-shaped member 18 as appears in Fig. 1.

The lowermost screw elements are indicated by the reference numeral 36, and each is provided at its outer end with a handle 38 whereby it may be rotated and at its inner end with a freely journalled ham impinging jaw 40 of arcuate shape and having teeth or serrations 42 and a pair of tines 44. This jaw is here shown as being removably carried by means of a screw 41 which is threaded into the end of the screw element 36.

The lowermost jaws are adapted to engage about the small end of the ham and are so constructed as to impinge the bone thereof and the uppermost jaws are adapted to impinge the large end of the ham as indicated in Fig. 1 so as to securely support the ham in the upright position. It will appear that the screw elements are adjustable toward and away from each other and that the jaws carried thereby are so supported as to be capable of engagement with the ham at angular positions and that the ham itself is so supported that it may be conveniently sliced. The pan like base serves the purpose of a drip pan and, in addition, serves as a support for the U-shaped member which may be removed therefrom.

What I claim is:

1. A ham holder comprising, in combination, a base, a rigid U-shaped member journalled in an upright position upon the base for rotation, means operable to lock said member in adjusted positions of rotation with respect to the base, a pair of ham-supporting elements one carried by each upright arm of the U member whereby said elements are arranged in opposed relationship and adapted to be moved toward or away from each other to engage a ham positioned between the arms of said U member.

2. A ham holder comprising, in combination, a base, a rigid U-shaped member journalled in an upright position upon the base for rotation, means operable to lock said member in adjusted positions of rotation with respect to the base, upper and lower pairs of ham-supporting elements, one element of each pair carried by one arm of the U member and the other element of each pair carried by the other arm of the U member whereby the elements of each pair are arranged in opposed relationship and adapted to be moved toward or away from each other to engage a ham positioned between said arms.

3. A ham holder comprising, in combination, a pan-like base, a rigid U-shaped member journalled within said base for rotation, means operable to automatically lock said member at adjusted positions of rotation with respect to the base, opposed ham-supporting elements carried by the upright arms of the U-member and adapted to be moved toward or away from each other to engage a ham positioned between said arms.

4. A ham holder comprising, in combination, a pan-like base having an upright pivot, a U-shaped member journalled upon said pivot for rotation within the base having opposed rigid upright arms provided with oppositely disposed threaded apertures, a screw element threaded within each aperture to be advanced or withdrawn with respect to the other screw element, and a ham engaging head journalled upon the inner head of each screw element.

5. A ham holder comprising, in combination, an annular dished base having an elevated axial portion surrounded by a depressed gutter-like portion, a rigid upright U-shaped member journalled upon said elevated portion for rotation, a pair of adjustable ham-supporting elements carried by each rigid arm of the U member and arranged opposite the elements carried by the other arm and adjustable toward and away from said other elements, each element provided with an end portion adapted to engage a ham positioned between said arms.

6. A ham holder comprising, in combination, a supporting base, an upright U-shaped member carried by the base, a pair of ham supporting elements carried by each arm of the U member arranged one above the other and adjustable toward and away from the elements carried by the other arm and an arcuate ham engaging jaw freely journalled upon the inner end of each element.

In testimony whereof I, JAMES N. KALKANIS, sign this specification.

JAMES N. KALKANIS.